US012716455B2

(12) United States Patent
Bube et al.

(10) Patent No.: US 12,716,455 B2
(45) Date of Patent: Aug. 25, 2026

(54) COUPLING BUSHING WITH SMOOTH-RUNNING SEAL

(71) Applicant: TI Automotive (Fuldabrueck) GmbH, Fuldabrueck (DE)

(72) Inventors: Kay Bube, Schenklengsfeld (DE); Iris Barthel, Schauenburg (DE); Andre Haeckel, Waldeck (DE); Harald Knobloch, Heidelberg (DE); Michael Roeder, Zierenberg (DE); Reiner Rohde, Malsfeld (DE)

(73) Assignee: TI AUTOMOTIVE (FULDABRUECK) GMBH, Fauldabrueck (DE)

( * ) Notice: Subject to any disclaimer, the term of this patent is extended or adjusted under 35 U.S.C. 154(b) by 105 days.

(21) Appl. No.: 18/760,108

(22) Filed: Jul. 1, 2024

(65) Prior Publication Data

US 2025/0092915 A1 Mar. 20, 2025

(30) Foreign Application Priority Data

Jun. 30, 2023 (DE) ......................... 102023117392.8
Sep. 20, 2023 (DE) ......................... 102023125438.3

(51) Int. Cl.

*F16C 33/74* (2006.01)
*F16C 17/02* (2006.01)
*F16C 35/02* (2006.01)

(52) U.S. Cl.

CPC .............. *F16C 33/74* (2013.01); *F16C 17/02* (2013.01); *F16C 35/02* (2013.01)

(58) Field of Classification Search

CPC .... F16L 37/142; F16L 37/0885; F16L 37/144
See application file for complete search history.

(56) References Cited

U.S. PATENT DOCUMENTS 10,344,900 B2 * 7/2019 Bauer ..................... B29C 65/00
12,188,595 B2 * 1/2025 Ginczek ............. F16L 37/0887
(Continued)

FOREIGN PATENT DOCUMENTS

DE 10017679 C1 * 9/2001 ....... F02M 35/10144
DE 102007060094 A1 6/2009
(Continued)

OTHER PUBLICATIONS

Bouquet Laurent, FR-2891889-A1, Apr. 13, 2007.*

*Primary Examiner* — Matthew Troutman
*Assistant Examiner* — James A Linford
(74) *Attorney, Agent, or Firm* — Dickinson Wright PLLC

(57) ABSTRACT

A coupling bushing including a bushing body having a sealing groove with a groove base and an inner groove wall as well as an outer groove wall. The inner groove wall and/or the outer groove wall here have at least one point, whose complete circulation as viewed in the longitudinal section of the coupling bushing at least sectionally deviates from a perpendicular to the middle axis (M). The bushing body comprises a head part and a sealing part, wherein the head part and the sealing part are manufactured separately from each other and connected with each other. The sealing part has the groove base and the inner groove wall. The coupling bushing comprises a decoupling ring, wherein the decoupling ring is manufactured separately from the head part. The decoupling ring forms at least one section of the outer groove wall with at least a portion of its rear side.

15 Claims, 5 Drawing Sheets

(56) References Cited

U.S. PATENT DOCUMENTS

| | | | | |
|---|---|---|---|---|
| 2008/0001398 | A1 * | 1/2008 | Stoll | B29C 66/12469 285/143.1 |
| 2020/0124218 | A1 | 4/2020 | Dreux et al. | |

FOREIGN PATENT DOCUMENTS

| | | | |
|---|---|---|---|
| DE | 202019002026 | U1 | 6/2019 |
| EP | 1600683 | A1 | 11/2005 |
| EP | 2206943 | A1 | 7/2010 |
| WO | 2023161849 | A1 | 8/2023 |

* cited by examiner 1
4
2,13
23
27
10
20
7
2,14
15
28
32
29
28
18
29
26
22
25
5
3
2,12
24
24
21

M
2,13
4
6
10
8
9
23
17
30
16
11
20
27

COUPLING BUSHING WITH SMOOTH-RUNNING SEAL

RELATED APPLICATIONS

The present disclosure claims priority to and the benefit of German Application 10 2023 117 392.8, filed on Jun. 30, 2023 and German Application 10 2023 125 438.3, filed on Sep. 20, 2023, the entire contents of each of which are incorporated herein by reference.

FIELD

The disclosure relates to a coupling bushing with a bushing body made out of several parts, as well as with a sealing groove that deviates from a purely rotational orbit. The disclosure further relates to a method for manufacturing this coupling bushing.

BACKGROUND

A coupling bushing is known from DE 20 2019 002 026 U1, wherein the inward end wall of the head part forms the outer groove wall of the sealing groove of the coupling bushing. As a consequence, the head part can also be regarded as a retaining ring, and the retaining ring and the head part are integrally connected with each other. The shape of the sealing groove is trapezoidal in design in the longitudinal section of the coupling bushing, wherein the radially outer groove base is somewhat wider than the radially inner groove opening. The head part is completely inserted into the sealing part, so that the head part simultaneously incorporates the coupling plug as well as the retainer. The exterior side of the head part has latching noses, which correspond with the appropriate recesses in the sealing part, and ensure that the head part latches into the sealing part.

DE 20 2019 002 026 U1 describes a sealing ring which deviates from a rotationally symmetrical shape in relation to the middle axis of the coupling section, at least in a state in which inserted into the bushing body. Depending on the circulating position, this sealing ring has longitudinal section surfaces whose surface center point is located axially further outward or axially further inward, depending on the circulating position. The deviation from the rotational symmetry causes the axially directed forces to be applied to be evened out in an imagined path-force diagram while introducing the coupling plug into the coupling bushing, thereby reducing the required maximum force. The deviation from the rotational symmetry of the sealing ring and the sealing groove is clearly reflected in a longitudinal section of the coupling bushing. As a result, this coupling bushing or its seal is relatively smooth-running while introducing the coupling plug.

EP 2 206 943 B1 describes a coupling bushing whose sealing groove is rotationally symmetrical. The head part is pushed into the sealing part and welded with the latter. However, the head part is not completely pushed into the sealing part, so that the head part is discernible from outside, and the retainer is only accommodated by the head part. At the same time, the axially inward end wall of the head part forms the retaining ring for the sealing ring. Due to the rotational symmetry of the contacting end walls, the head part and the sealing part can be turned around the middle axis of the coupling section in practically any manner relative to each other, which yields a desirable flexibility with regard to the geometry of the coupling bushing.

By contrast, the head part cannot be turned relative to the sealing part in whatever way desired in the case of DE 20 2019 002 026 U1, which stems from the latching connection on the one hand, and from the deviation of the rotational symmetry of the sealing groove on the other.

BRIEF SUMMARY

The present disclosure provides a coupling bushing that offers great flexibility in terms of the rotation of the head part relative to the sealing part on the one hand, and is relatively smooth running while introducing the coupling plug on the other.

The coupling bushing or the bushing body preferably comprises a decoupling ring for decoupling the head part from the sealing groove, wherein the decoupling ring is manufactured separately from the head part, so that the decoupling ring is not integrally connected with the head part, wherein an axially inwardly facing rear side of the decoupling ring forms at least one section of the outer groove wall.

The instruction of DE 20 2019 002 026 U1 cannot be reconciled with the instruction of EP 2 206 943 B1. The front sides of the head part and the sealing part must each be rotationally symmetrical in design, so that the head part and the sealing part fit together in practically every rotational position. At the same time, the sealing groove must deviate from the rotational symmetry, so that the mentioned evening out of the axial forces to be applied can be brought about while introducing the coupling plug into the coupling bushing.

In the present disclosure, the front side of the head part facing the sealing part is decoupled from the sealing groove via the additional decoupling ring, which is contrary to the express instruction of DE 20 2019 002 026 U1 and EP 2 206 943 B1. This is because this requires an additional part in the form of a separately manufactured part, which increases the production cost. Both an additional injection molding tool on the one hand as well as an additional manufacturing step for fastening the decoupling ring in the sealing part are required, even though the automotive supply market is extremely price sensitive. In particular, it was found that decoupling makes it possible to adjust the separate decoupling ring on the axially outward side to the head part, and thereby give it a rotationally symmetrical design, while the axially inward side of the decoupling ring can be adjusted to the sealing groove.

In EP 1 600 683 B1 the retaining ring disclosed therein serves to hold the sealing ring during the process of encapsulating the head part. In particular, the retaining ring serves to shield the sealing ring against the molten mass of the head part during the encapsulation process. If there were no retaining ring, the sealing ring would become embedded in the molten mass, and after the latter had solidified would lose the necessary elasticity in the solidified mass. The retaining ring or shielding ring thus makes sense primarily in the case of manufacturing the head part via encapsulation. Without encapsulation, the retaining function could be simply integrated into the head part, just as for the other previously known embodiments.

Finally, decoupling the head part represents the best of all solutions for providing the two functions mentioned at the outset. For example, the sealing ring as viewed in longitudinal section could have a larger axial expansion, wherein the sealing ring is simultaneously less compressed in a radial direction by the coupling plug. However, the smaller tolerances drive up the costs even higher than the separate decoupling ring. According to another discarded solution, the sealing ring or the coupling plug could be provided with a sliding coating. In the case of the coated coupling plug, however, too much effort would be shifted to third parties, and mainly to the car manufacturers. First and foremost, the interplay between the coupling plug and coupling bushing would have to be tested, which would require the participation of the coupling plug supplier (most often the supplier of an aggregate or a component connected with a fluid line) and ultimately also of the car manufacturer. In the case of the coated sealing rings, prices for the sealing rings would increase many times over, since custom products would here be involved. In addition, the rubbery material of the sealing rings and the fluid contact make coating extremely demanding and give it only a very limited long-term stability. As a result, it was found that the functions mentioned at the outset is achieved in an especially satisfactory manner by the solution according to the present disclosure.

The term "whose complete circulation as viewed in the longitudinal section of the coupling bushing deviates at least sectionally from a perpendicular to the middle axis" preferably refers to a deviation from the complete rotational symmetry of this point in relation to the middle axis. Furthermore, the term preferably means that the circulation of the point is described not only by the rotation in a peripheral direction, but also by an additional axial and/or radial component.

The term "integral" preferably means that the connection is not just one-piece (e.g., welded), but in addition also generated by casting or injection molding with only a single material source. By contrast, a two-component injection mold—if a material closure takes place between the two components—is not an integral connection, but rather a one-piece connection. The term "one-piece connection" preferably means that the two elements connected with each other via material closure (welding or bonding) can only be irreversibly or destructively detached from each other. For example, a reversible connection refers to a detachable latched connection or a screwed connection. A welded joint may constitute a one-piece, but not integral connection.

The directional indication "axially inward" or "axially inwards" preferably refers to the axial direction from the coupling section toward the connecting section. The directional indications "axially outward" and "axially outwards" preferably refer to the axial direction from the connecting section toward the coupling section.

According to a preferred embodiment, the inner groove wall is connected as one piece and preferably integrally with the sealing part or the connecting section or the groove base or the at least one angle setting element. This results in an advantageous stability of the sealing part or a low-cost production of the sealing part.

It is preferred that the decoupling ring be manufactured separately from the sealing part, so that the decoupling ring is not integrally connected with the sealing part. This makes it possible to prefix the sealing ring and more easily introduce the sealing ring while manufacturing the coupling bushing. The decoupling ring can be force-fit and/or form-fit and/or materially connected with the sealing part. For example, the decoupling ring can be connected with the sealing part via press fitting and/or via latching and/or as one-piece and in particular via welding, e.g., laser or rotation welding. It is possible for the decoupling ring to be arranged without contact relative to the head part in the bushing body. According to an embodiment, the decoupling ring touches at least one complementary angle setting element of the head part.

According to another preferred embodiment, one point of an axially inward rear side of the decoupling ring at least sectionally deviates from a perpendicular to the middle axis along an in particular complete circulation as viewed in a longitudinal section of the coupling bushing. This makes it possible to parallelize the outer groove wall relative to the inner groove wall, which yields a comparatively constant squeezing of the sealing ring. As a consequence, the force-fit between the complementary coupling plug and the sealing ring is very uniform in design along a circulation, so that the fluid will find practically no weak points on the sealing ring. This results in an especially good seal.

It is preferred that the inner groove wall and the outer groove wall be parallel to each other in design in the at least sectionally peripheral direction, preferably along a complete circulation. In a longitudinal section of the coupling bushing, one point of the outer groove wall and one point of the inner groove wall at the same radial height r preferably define a distance A0 between each other, wherein the distance $A(\alpha)$ between these two points along a complete circulation (angle $\alpha$ around the middle axis) deviates by no more than 90% or 70% or 50% or 30% from the distance A0 in the longitudinal section: $|A0-A(\alpha)|/A0<\Delta=0.9$ or 0.8 or 0.5 or 0.3.

In the longitudinal section of the coupling bushing, it is advantageous that one point of the inner groove wall and/or outer groove wall describe an orbital path given a complete circulation. The orbital path of the point preferably has at least one furthest axially inward location (axial minimum) and at least one furthest axially outward location (axial maximum). An axial difference D between the axial minimum and the axial maximum is preferably $>1/10$ or $1/8$ or $1/6$ or $1/4$ of the axial expansion of a cross sectional surface of the sealing ring in the longitudinal section of the coupling bushing in the relaxed state.

According to another preferred embodiment, the orbital path of the point of the inner groove wall comprises two axial minima and two axial maxima in the longitudinal section of the coupling bushing along a complete circulation. The two axial maxima preferably lie diametrically opposite each other with respect to the middle axis. The two minima expediently lie diametrically opposite each other with respect to the middle axis. It is preferred that the axial maxima and minima of the orbital path be arranged equidistantly from each other on the orbital path. The axial position of the orbital path as recorded over the orbital angle preferably varies in a wavelike manner, thereby forming the axial minima and maxima. The at least two axial minima and maxima produce an especially stable mounting of the sealing ring in the sealing groove while the coupling plug is being introduced.

The decoupling ring and/or the head part and/or the sealing part expediently comprises a plastic. This makes it possible to manufacture these components via injection molding, providing for a low-cost production by comparison to metal products. It is preferred that the decoupling ring and/or the head part and/or the sealing part have at least 30 or 50 or 70 or 90% w/w plastic. The decoupling ring, head part and sealing part can have the same plastic or different plastics.

The decoupling ring is preferably form-fit with the sealing part in the peripheral direction, in particular by way of a tongue-and-groove connection. This enables a defined alignment of the decoupling ring in the orbital direction relative to the inner groove wall or to the sealing part. It is preferred that the decoupling ring comprise an angle determining element. It is advantageous that the sealing part have a complementary angle determining element. The complementary angle determining element is expediently complementary in design to the angle determining element. The angle determining element and the complementary angle determining element preferably form a tongue-and-groove connection. According to one embodiment, the angle determining element is designed as a groove, into which the complementary angle determining element engages in the form of a projection.

It is advantageous that the coupling bushing be designed in such a way that the head part can be turned around the middle axis relative to the sealing part, before a reversible or irreversible attachment to each other takes place, so that a plurality of possible angular positions is provided between the head part and the sealing part. This permits a greater production flexibility given satisfactory degrees of freedom in selecting the angular position. For example, a sealing part angled in the longitudinal section can be assembled with the head part in various angle positions in the peripheral direction, resulting in correspondingly numerous different coupling bushings. In the case of an integral coupling body, a costly injection molding tool would be required every time for these different coupling bushings. Because the head part and sealing part are manufactured separately, however, only two injection molding tools are required, although a plurality of different coupling bushings are possible using the modular principle. In particular, the head part can also be combined with different sealing parts. For example, the head part can also be combined with sealing parts that are only angled by 45° or not at all.

It is advantageous if only one defined or limited or discrete number of angular positions is provided. The coupling bushing advantageously comprises at least 2 or 3 or 4 or 5 or 6 or 8 or 10 or 12 or 15 defined angular positions. It is especially preferred that the angular positions represent equidistant angular differences in the peripheral direction. The coupling bushing is advantageously designed in such a way that the angular positions can be produced via an/the angle setting element and/or a/the complementary angle setting element.

It is preferred that the sealing part comprise at least one angle setting element for setting an angular position in the peripheral direction between the sealing part and the head part, wherein the head part has at least one angle setting element complementary to the angle setting element. It is preferred that the at least one angle setting element be tooth shaped, and preferably comprise a recess adjacent in the peripheral direction. The complementary angle setting element preferably has a recess shape, and preferably a tooth adjacent in the peripheral direction. The angle setting element preferably extends over at most 180° or 120° or 90° or 72° or 60° or 45° or 36° or 30° in the peripheral direction. The number of angle setting elements or complementary angle setting elements expediently defines the number of defined angle positions or the expansion of an angle setting element or complementary angle setting element in the peripheral direction. It is very preferred that the sealing part have a plurality of angle setting elements.

The head part expediently comprises a plurality of complementary angle setting elements. It is preferred that the number of angle setting elements correspond to the number of complementary angle setting elements. The angle setting elements are advantageously identical in design to each other. It is preferred that the complementary angle setting elements be identical in design to each other.

The decoupling ring preferably comprises an introduction surface, the contour of which as viewed in a longitudinal section from the coupling bushing comprises at least one axial and one radial component. This enables an improved introduction of the complementary coupling plug. The introduction surface is preferably completely circumferential in design. It is advantageous that the introduction surface define a tapering opening in the axially inward direction. The introduction surface can be conical in design.

It is advantageous that the groove base and/or the inner groove wall and/or the outer groove wall at least sectionally have a bent contour as viewed in a longitudinal section of the coupling bushing. This enables a reliable accommodation of the sealing ring. It is preferred that the bent contour of the inner groove wall comprise an axially inwardly directed bulge as viewed in the longitudinal section. It is possible for the outer groove wall to comprise a straight contour or a contour that only extends in the radial direction. It is possible for the groove base to have a contour that extends only in an axial direction as viewed in the longitudinal section of the coupling bushing.

The coupling bushing advantageously comprises a display element for displaying a position of the coupling plug inside of the coupling bushing. This provides for greater assembly safety. It is possible for the coupling bushing to be designed in such a way that the display element display that the coupling plug was completely inserted into the coupling bushing. According to an embodiment, the coupling bushing is designed in such a way that the display element displays that the coupling plug was not completely inserted into the coupling bushing. The display element can show an optical and/or haptic and/or electric or electronic display signal. For example, the display element can be designed as a QR code and/or as an element protruding out of the coupling body and/or as a radio signal. It is preferred that the display element come into direct or indirect contact with the coupling plug. A sliding element can possibly be moved in an axial direction on an exterior side of the coupling body only with the coupling plug in a completely inserted state, so that an optical code, for example a QR code or a barcode, becomes visible to the user. It is possible for the retainer to have an indicator or indicator element, so that the retainer can only be inserted into the coupling body given a completely inserted coupling plug, as a result of which an optical and haptic signal is generated. It is possible for a circuit to remain open or be closed in the case of an uninserted coupling plug, so that a chip emits a corresponding radio signal.

It is advantageous for the coupling bushing to be designed in such a way that the head part and the sealing part become increasingly form-fitting in the peripheral direction while being brought together in an axial direction. This enables a secure fit while assembling the head part and the sealing part, and simultaneously ensures a defined position in the peripheral direction of the head part and sealing part relative to each other. In addition, this generates a haptic which signals the user that the assembled parts were put together in an intended manner.

While bringing together the head part and sealing part, the angle setting element advantageously engages into the complementary angle determining element in an axial direction. It is very preferred that the angle setting element and the complementary angle setting element become form-fitting while bringing together the head part and the sealing part in an axial direction and/or in the peripheral direction, so that when the head part and sealing part touch in an axial direction, a movement between the head part and sealing part in the peripheral direction is simultaneously also no longer possible. It is preferred that the at least one angle setting element of the sealing part taper or broaden in an axially outward direction in terms of the expansion in the peripheral direction. The at least one angle setting element and the at least one complementary angle setting element preferably form a tongue-and-groove connection, wherein the groove of this tongue-and-groove connection tapers toward the groove base.

It is possible for the retainer to be designed as a wire bow or as an injection molded part. As a result, suitable retainers are provided. It is possible for the retainer to be U-shaped or completely circumferential in design. The retainer designed as a wire bow is preferably U-shaped, and has two U-legs as well as a U-base. It is advantageous that the retainer be designed separately from the bushing body or head part or sealing part. The retainer is preferably moveably mounted in the bushing body or head part. The retainer expediently defines an insertion direction along which the retainer is inserted into the bushing body or the head part.

The functions mentioned at the outset is achieved by a fluid line, wherein the fluid line comprises a coupling bushing according to the disclosure and a tube. This shifts the fluidic complexity to the fluid line, so that the coupling plug can be given a significantly simpler design. As a consequence, the aggregates can be equipped with simple coupling plugs, thereby ensuring a clear separation of tasks between the different suppliers. It is preferred that the tube and/or the coupling body have at least 30 or 50 or 70 or 90% w/w plastic. The connecting section of the coupling body is preferably designed as a plug section. It is possible for the tube to be plugged onto the connecting section or inserted into the connecting section. The connection between the tube and the connecting section is preferably force-fit and/or form-fit and/or material in design. For example, the tube can be plugged onto the connecting section via press fitting, which produces a force- and form-fit connection. It is also possible to insert the tube into a receptacle of the connecting section, so as to establish a material connection in a second step. In particular, the material connection can be produced via welding, and preferably via laser welding.

The functions mentioned at the outset is achieved by a method for manufacturing a coupling bushing according to the disclosure, wherein the decoupling ring is fastened to the sealing part, wherein the head part is then preferably fastened to the sealing part. The sealing ring is preferably placed in the sealing part before fastening the decoupling ring to the sealing part.

BRIEF DESCRIPTION OF THE DRAWINGS

The disclosure will be described below based on five figures of an exemplary embodiment. Schematically shown on.

DETAILED DESCRIPTION

Figure 1:
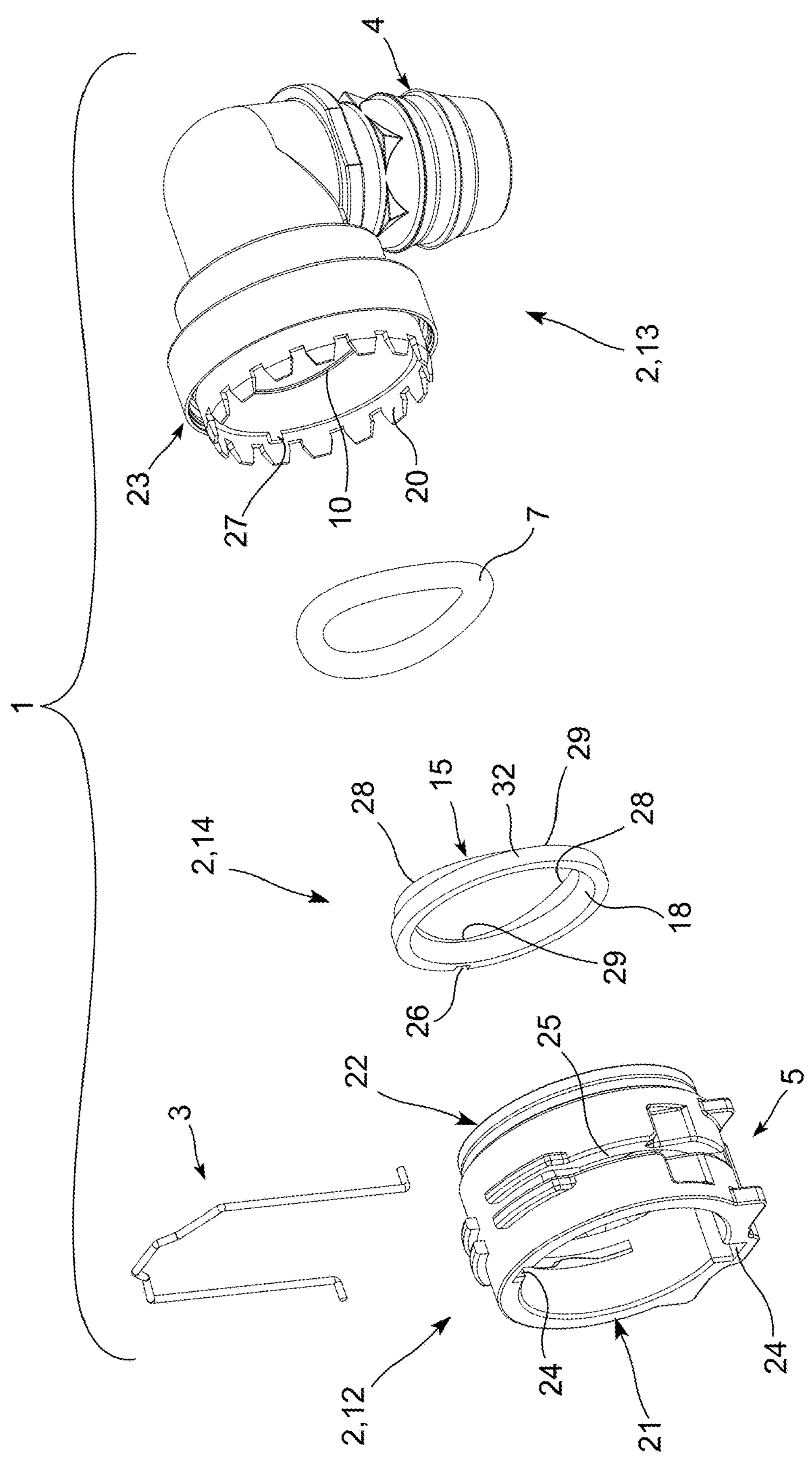
FIG. 1 is an exploded view of a coupling bushing according to the disclosure.

According to FIG. 1, the coupling bushing 1 comprises a bushing body 2 as well as a retainer 3 and a sealing ring 7. The retainer 3 in this initial example is preferably VDA ("Verband der Automobilindustrie") compliant, and can be configured as a U-shaped wire bow with a U-base and two U-legs. The sealing ring 7 preferably comprises an elastomer for the force-fit sealing of the coupling bushing 1 against a complementary coupling plug not shown here.

The coupling plug can have a groove or a shoulder on its exterior side, with which the coupling plug can be latched on the retainer 3 in a known manner inside of the coupling bushing 1. It is preferred that the retainer 3 and/or the sealing ring 7 can be reversibly removed from the coupling bushing 1. The term "reversibly" preferably refers to a nondestructive removal.

Figure 2:
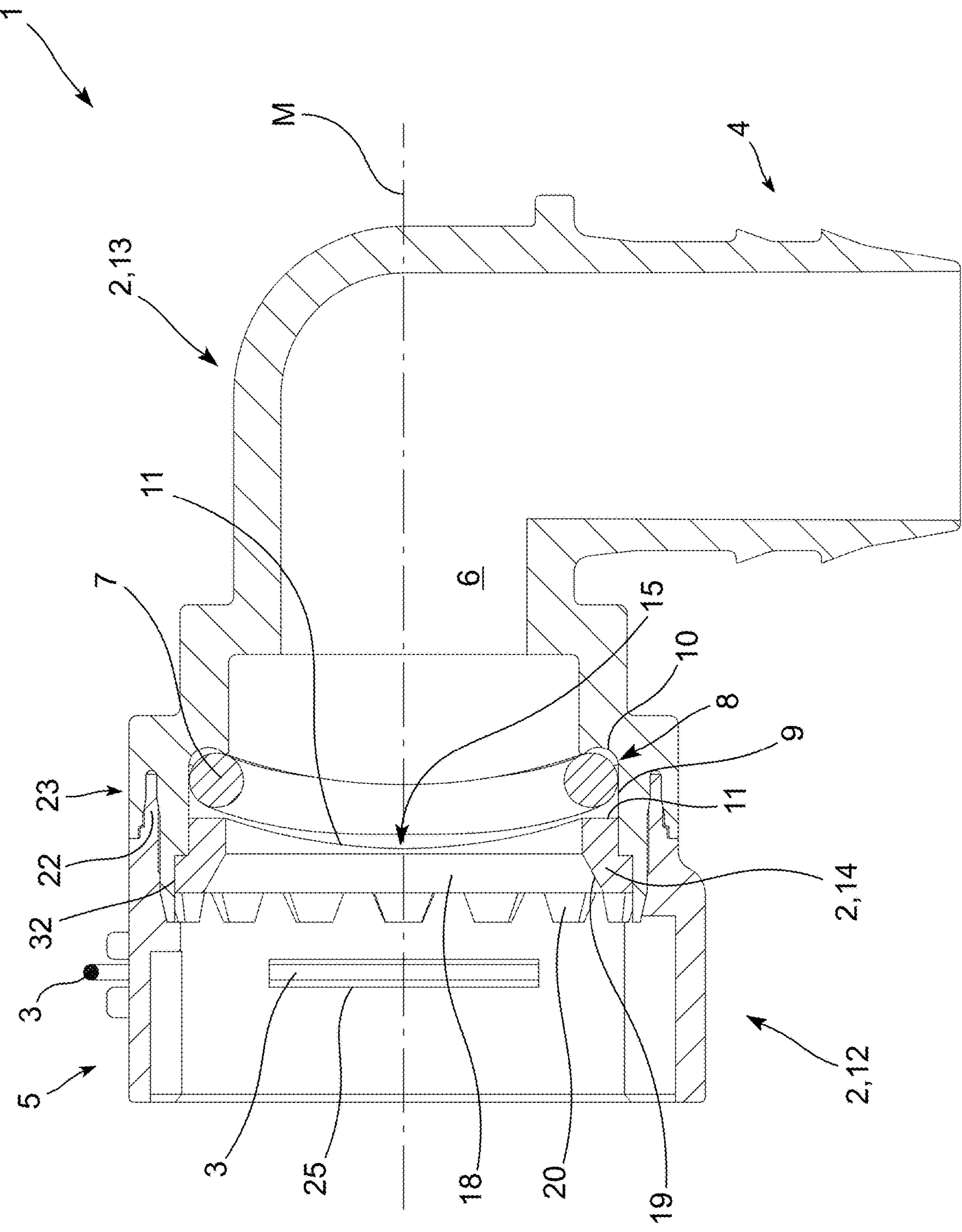
FIG. 2 is a longitudinal section through the coupling bushing on FIG. 1 in an assembled state.

As shown on FIGS. 1 and 2, the bushing body 2 has a head part 12, a decoupling ring 14 as well as a sealing part 13. In this exemplary embodiment, the sealing ring 7 is preferably placed in the sealing part 13 first, whereupon the decoupling ring 14 is then expediently placed in the sealing part 13 in order to prefix the sealing ring 7, and for purposes of a decoupling to be described in more detail below.

It is preferred that the head part 12 be connected with the sealing part 13 after the decoupling ring 14 has been fastened to the sealing part 13. The head part 12 preferably comprises a contact section 22 for contacting the sealing part 13. The sealing part 13 advantageously has a contact section 23 for contacting the head part 12. In this exemplary embodiment, the contact section 22 of the head part 12 and the contact section 23 of the sealing part 13 are welded together, and in particular connected with each other via laser welding.

The head part 12, the decoupling ring 14 and/or the sealing part 13 are preferably each manufactured out of plastic, in particular via injection molding. According to the disclosure, the head part 12, the decoupling ring 14 as well as the sealing ring 13 are manufactured separately from each other. In this exemplary embodiment, the head part 12, the decoupling ring 14 as well as the sealing part 13 form a one-piece bushing body 2 based upon the two welds.

In this exemplary embodiment, the decoupling ring 14 is fastened onto a radial exterior side 32 of the decoupling ring 14 on the sealing part 13 or inside of the sealing part 13 via a circumferential—preferably completely circumferential-welded joint. The coupling bushing 1 or the bushing body 2 expediently comprises an end wall 21, which is allocated to the head part 12 and faces a coupling plug to be inserted.

The decoupling ring 14 advantageously comprises an angle determining element 26, which corresponds with a complementary angle determining element 27 of the sealing part 13. In this exemplary embodiment, the angle determining element 26 is designed as a groove on the radial exterior side 32 of the decoupling ring 14. The complementary angle determining element 27 is expediently designed as a spring complementary to the angle determining element 26. The decoupling ring preferably comprises an insertion surface 18, which advantageously is arranged on the front side or axially outward side of the decoupling ring 14. The insertion surface 18 tapers in the axially inward direction in a longitudinal section of the coupling bushing 1, and for example can have a conical shape expressed in a sloping contour 19 in the longitudinal section according to FIG. 2.

According to FIG. 2, a rear side 15 of the decoupling ring 14 preferably has two inward sections 28 expanded in an axial direction, and expediently also two axially outward sections 29. As a result, the sealing ring 7 extends over several planes extending perpendicular to the middle axis M in the inserted state. As a consequence, the forces to be axially applied while inserting the coupling plug are evened out in a force-path diagram or lengthened in a “flatten the curve” sense, so that the insertion of the coupling plug is smoother running overall.

The head part 12 can have a retainer receptacle 25 in a known manner, which as depicted on FIGS. 1 and 2 can incorporate in particular the U-legs of the retainer 3. According to the disclosure, the head part 12 comprises at least a portion of a coupling section 5. The coupling section 5 may be defined in particular by the maximum axial extension of the coupling plug inside of the coupling bushing 1, and as can be surmised from the exemplary embodiment on FIG. 2, can also extend until into the sealing part 13.

It is possible for the head part 12 or the bushing body 2 to comprise a rotation lock 24, which prevents the coupling plug from twisting in the bushing body 2. The rotation lock 24 can comprise at least one groove or one tongue, and according to FIG. 1 can in particular have two grooves.

According to the disclosure, the sealing part 13 comprises a connecting section 4 for connection with a tube or an aggregate. The connecting section 4 may be designed for an upcoming connection with a tube or an aggregate, but can also already have entered into a connection with a tube or aggregate. The connecting section 4 can be designed to be plugged on or in, and can comprise a material, a force-fit and/or a form-fit connection. In the present exemplary embodiment, the connecting section 4 is designed with barbs or ribs on the exterior side, so as to securely fasten a tube plugged thereon or an aggregate plugged thereon (neither is shown). The connecting section 4 and the coupling section 5 are expediently fluidically connected with each other via a fluid channel 6 of the bushing body 2.

In this exemplary embodiment, the coupling bushing 1 according to FIGS. 1 and 2 is angled in design, so that a middle axis M of the coupling section 5 deviates from a center axis of the connecting section 4 not shown on the figures in a longitudinal section of the coupling bushing 1. In particular, the middle axis M and the center axis can form a right angle relative to each other, for example. Angulation is preferably realized in the sealing part 13, so that the head part 12 can be connected with a plurality of different sealing parts 13 each having different angulations.

Figure 5:
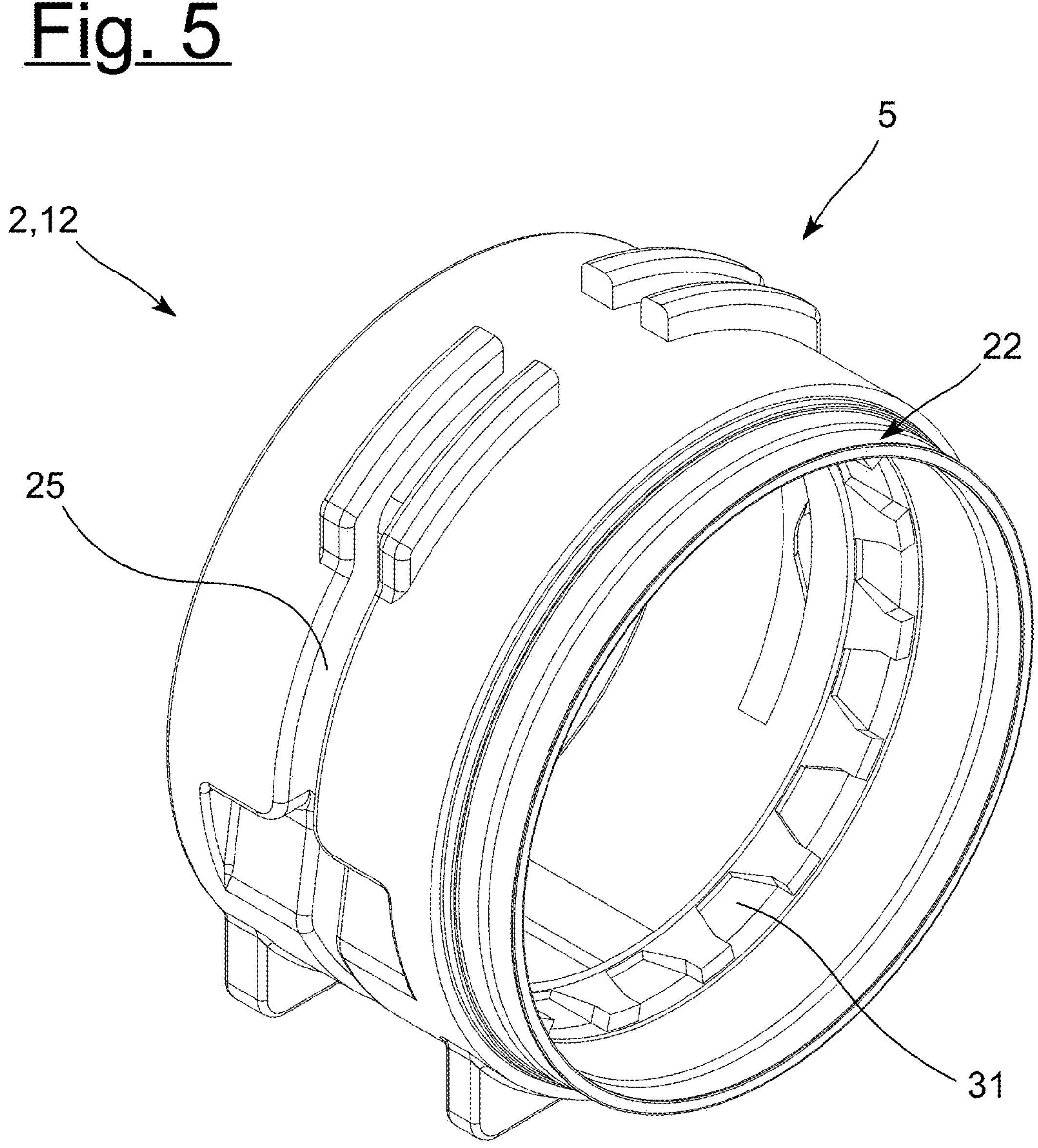
FIG. 5 is a perspective view of a head part of the coupling bushing on FIGS. 1 and 2.

The sealing part 13 according to FIGS. 1 and 2 especially preferably comprises at least one angle setting element 20. The head part 12 advantageously comprises at least one complementary angle setting element 31, see FIG. 5. The sealing part 13 and/or the head part 12 expediently comprises a plurality of angle setting elements 20 or complementary angle setting elements 31. While putting together the head part 12 and the sealing part 13, it is preferred that the angle setting elements 20 or the complementary angle setting elements 31 interlock with each other or comb with each other. It is very preferred that the at least one angle setting element 20 or the at least one complementary angle setting element 31 can be used to connect the head part 12 and the sealing part 13 with each other in a plurality of rotational positions around the middle axis M, so that the connecting section 4 can assume several angular positions relative to the head part 12 or retainer 3. In the present exemplary embodiment, the sealing part 13 comprises sixteen angle setting elements 20, and the head part 12 comprises sixteen complementary angle setting elements 31, so that the sealing part 13 and the head part 12 can be fastened in 22.5 increments to each other.

Figure 4:
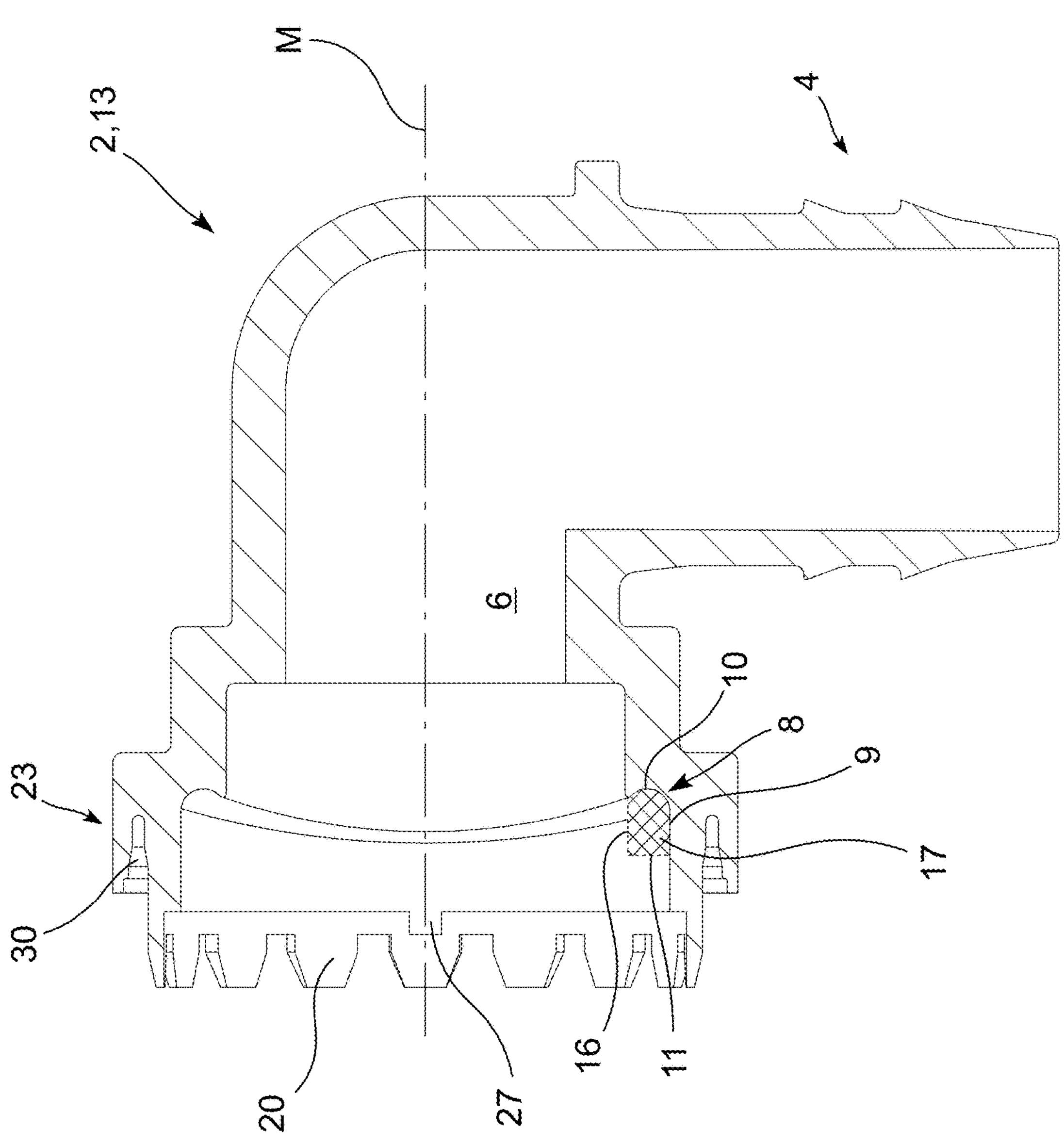
FIG. 4 is a sealing part of the coupling bushing on FIGS. 1 and 2 in longitudinal section.

According to FIG. 4, the contact section 23 of the sealing part 13 comprises a header receptacle 30, into which the contact section 22 of the head part 12 engages, see FIG. 2.

In this exemplary embodiment, the two contact sections 22, 23 are materially connected with each other, for example through laser welding.

Figure 3:
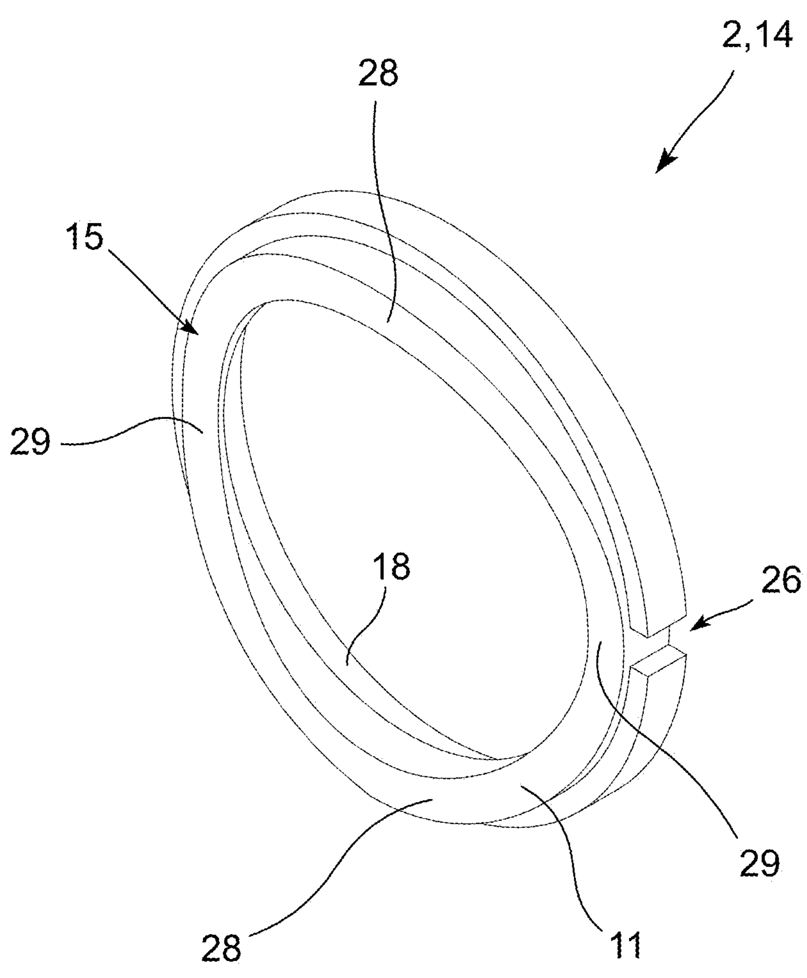
FIG. 3 is a perspective view of a decoupling ring according to the disclosure of the coupling bushing on FIGS. 1 and 2.

As depicted in particular on FIG. 2, the decoupling ring 14 has an axially inwardly facing rear side 15, which in the longitudinal section on FIG. 2 forms no perpendicular or no sequence of several perpendiculars. The contour of the rear side 15 is preferably bent in design in the longitudinal section according to FIG. 2. The rear side 15 of the decoupling ring 14 is also readily visible on FIGS. 1 and 3. As a consequence, the rear side 15 of the decoupling ring 14 in this exemplary embodiment comprises a continuous tape, which in the assembled state of the coupling bushing 1 forms an outer groove wall 11, see FIG. 3. As evident from FIG. 2, the rear side 15 is expanded the most in an axially inward direction in a radial upper area as well as in a radial lower area. By contrast, the rear side 15 of the decoupling ring 14 is expanded the least in an axially inward direction in the two radially middle areas in the longitudinal section according to FIG. 2.

As evident above all on FIG. 2, the coupling bushing comprises a sealing groove 8, in which the sealing ring 7 is arranged. The sealing groove 8 comprises a radially outer groove base 9 as well as an axially inner groove wall 10 and the already mentioned axially outer groove wall 11. According to the disclosure, at least a portion of the rear side 15 of the decoupling ring 14 forms at least a portion of the outer groove wall 11.

The inner groove wall 10 is more discernible on FIG. 4, because the sealing ring 7 was here omitted to better visualize the sealing groove 8. In the exemplary embodiment, the inner groove wall 10 in a longitudinal section of the sealing part 13 on FIG. 4 preferably has a bent shape in a radial direction along the entire longitudinal section of the sealing part 13. In addition, the decoupling ring 14 was omitted on FIG. 4 to better visualize the remaining components of the sealing groove 8. By contrast, the outer groove wall 11 was denoted by means of a dashed line. The inner groove wall 10 and the outer groove wall 11 preferably define a groove opening 16 in a longitudinal section of the coupling bushing 1 or the sealing part 13, which likewise was sketched via a dashed line. The inner groove wall 10, the outer groove wall 11, the groove base 9 and the groove opening 16 expediently define a longitudinal section area 17 of the sealing groove 8, here shown hatched. A surface center may be allocated to the longitudinal section area 17. In this exemplary embodiment, the surface center of the longitudinal section area 17 deviates from a perpendicular to the middle axis M along a circulation around the middle axis M as viewed in the longitudinal section of the coupling bushing.

As may be gleaned from FIG. 2 and even more so from FIG. 4, any point on the contour of the inner groove wall 10 along a complete circulation around the middle axis M does not remain in one plane perpendicular to the middle axis M in this exemplary embodiment. Instead, the inner groove wall 10 is preferably parallel to the outer groove wall 11, so that any point on the contour of the inner groove wall 10 during a complete circulation is parallel to the circulation of any other point on the outer groove wall 11. In particular, the radially outer areas of the inner groove wall 10 are axially arranged further inwards on FIG. 4, while the two areas lying radially, and thus closer to the middle axis M, are axially arranged further outwards in the longitudinal section according to FIG. 4.

By contrast, the front side or axially outward side of the decoupling ring 14 preferably does not deviate from a rotationally symmetrical design. The decoupling ring 14 thus permits a decoupling of the head part 12 from the sealing part 13 or from the sealing groove 8. As a consequence, this, among other factors, always ensures a compatibility with the head part 12.

The sealing ring 7 may have a toroidal shape, and in particular be an ideal rotational torus. If the sealing ring 7 is inserted into the sealing groove 8 and prefixed by the decoupling ring 14, the sealing ring 7 assumes roughly the progression of the sealing groove 8, expediently without changing its longitudinal section area. This is most evident from FIG. 2.

REFERENCE LIST

1 Coupling bushing
2 Bushing body
3 Retainer
4 Connecting section of 2
5 Coupling section of 2
6 Fluid channel of 2
7 Sealing ring
8 Sealing groove of 2
9 Groove base of 8
10 Inner groove wall of 8
11 Outer groove wall of 8
12 Head part
13 Sealing part
14 Decoupling ring
15 Rear side of 14
16 Groove opening of 8
17 Longitudinal section area of 8
18 Insertion surface of 14
19 Contour of 18
20 Angle setting element of 13
21 End wall of 1, 2, 12
22 Contact section of 12
23 Contact section of 13
24 Rotation lock of 1 for coupling plug
25 Retainer receptacle
26 Angle determining element of 14
27 Complementary angle determining element of 13
28 Inward section of 15
29 Outward section of 15
30 Head part receptacle of 13, 23
31 Complementary angle setting element of 12
32 Radial exterior side of 14
M Middle axis

The invention claimed is:

1. A coupling bushing, comprising a bushing body and a retainer, wherein the bushing body comprises a connecting section and a coupling section, wherein the retainer is arranged in the coupling section, wherein the coupling section is designed to incorporate a complementary coupling plug, wherein the connecting section is configured to be connected with a tube or an aggregate, wherein a fluid channel of the bushing body fluidically connects the coupling section and the connecting section with each other, wherein a middle axis (M) of the coupling section defines an axial, a radial and a peripheral direction of the coupling section, wherein the coupling bushing comprises at least one sealing ring, wherein the coupling bushing has a sealing groove, wherein the sealing ring is arranged in the sealing groove, wherein the sealing groove comprises a groove base and, in an axial direction, an inner groove wall as well as an outer groove wall, wherein, as viewed in a longitudinal section of the coupling bushing, the inner groove wall and/or the outer groove wall has at least one point or each have at least one point, whose complete circulation as viewed in the longitudinal section of the coupling bushing at least sectionally deviates from a-perpendicular to the middle axis (M), wherein the bushing body has a head part and a sealing part, wherein the head part and the sealing part are manufactured separately from each other and connected with each other, wherein the head part at least partially comprises the coupling section, wherein the sealing part at least partially comprises the connecting section, wherein the sealing part has the groove base and the inner groove wall, and wherein the coupling bushing or the bushing body comprises a decoupling ring for decoupling the head part from the sealing groove, wherein the decoupling ring is manufactured separately from the head part, so that the decoupling ring is not integrally connected with the head part, wherein the decoupling ring forms at least one section of the outer groove wall with at least a portion of an axially inwardly facing rear side.

2. The coupling bushing according to claim 1, wherein the inner groove wall is connected as one piece and integrally with the sealing part or the connecting section.

3. The coupling bushing according to claim 1, wherein the decoupling ring is manufactured separately from the sealing part, so that the decoupling ring is not integrally connected with the sealing part.

4. The coupling bushing according to claim 1, wherein one point of an axially inward rear side of the decoupling ring at least sectionally deviates from perpendicular to the middle axis (M) along a circulation as viewed in a longitudinal section of the coupling bushing.

5. The coupling bushing according to claim 1, wherein the decoupling ring and/or the head part and/or the sealing part comprises plastic.

6. The coupling bushing according to claim 1, wherein the decoupling ring is form-fit with the sealing part in the peripheral direction by way of a tongue-and-groove connection.

7. The coupling bushing according to claim 1, wherein the coupling bushing is designed in such a way that the head part can be turned around the middle axis (M) relative to the sealing part, before a reversible or irreversible attachment to each other takes place, so that a plurality of possible angular positions is provided between the head part and the sealing part.

8. The coupling bushing according to claim 1, wherein the sealing part comprises at least one angle setting element for setting an angular position in the peripheral direction between the sealing part and the head part, wherein the head part has at least one angle setting element complementary to the angle setting element.

9. The coupling bushing according to claim 1, wherein the decoupling ring comprises an introduction surface, the contour of which as viewed in a longitudinal section from the coupling bushing comprises at least one axial and one radial component.

10. The coupling bushing according to claim 1, wherein the groove base and/or the inner groove wall and/or the outer groove wall at least sectionally has/have a bent contour as viewed in a longitudinal section of the coupling bushing.

11. The coupling bushing according to claim 1, wherein the coupling bushing comprises a display element for displaying a position of the coupling plug inside of the coupling bushing.

12. The coupling bushing according to claim 1, wherein the coupling bushing is designed in such a way that the head part and the sealing part become form-fitting in the peripheral direction while being brought together in an axial direction.

13. The coupling bushing according to claim 1, wherein the retainer is a wire bow or an injection molded part.

14. A fluid line, comprising a coupling bushing according to claim 1, and a tube coupled to the coupling bushing.

15. A method for manufacturing a coupling bushing, comprising providing the coupling bushing according to claim 1, wherein the decoupling ring is fastened to the sealing part, wherein the head part is then fastened to the sealing part.

* * * * *